United States Patent Office 2,785,182
Patented Mar. 12, 1957

2,785,182

SUBSTITUTED PYRROLECARBOXAMIDO-
PYRROLES

Coy W. Waller, Nanuet, N. Y., and Martin J. Weiss, Highland Park, and John S. Webb, Warren Township, Somerset County, N. J., assignors to American Cyanamid Company, New York, N. Y., a corporation of Maine No Drawing. Application April 19, 1954,
Serial No. 424,263

3 Claims. (Cl. 260—326.3)

This invention relates to new organic compounds. More particularly, it relates to substituted pyrrole-carboxamido-pyrroles and their preparation.

For many years a study of pyrrole chemistry has been carried out by numerous investigators because of the presence of this heterocyclic nucleus in the structures of haemoglobin and chlorophyll. During the course of this work many pyrrole compounds have been described bearing various substituents. However, the present compounds which are 4-(1-alkyl-4-substituted aminopyrrole-2-carboxamido)pyrrole-2-carboxylic acids and amides have not been described.

The compounds of the present invention may be illustrated by the following structural formula:

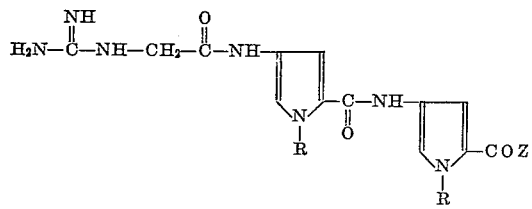

in which R is an alkyl radical, and Z is an amino acid or an amino alkanoylamide. Since these compounds contain amino radicals, they can form salts which are intended to be included within the scope of this invention.

The compounds of the present invention are, in general crystalline solids with relatively high melting points. The are soluble in the usual organic solvents such as alcohol, pyridine, dimethylformamide, etc. In the form of their salts they are water soluble.

These compounds can be prepared by different methods which are described and claimed in our copending applications, Serial Numbers 424,261, and 424,262, filed April 19, 1954.

The example hereinafter describes in detail the process of the copending applications leading to starting material of the present application.

We have found that compounds of the present invention have antibacterial activity against a number of Gram-positive and Gram-negative bacteria, and also antiviral activity against equine encephalomyelitis.

The compounds of the present invention are useful as intermediates for the synthesis of antibacterial substances. The compounds also show local anesthetic and analgesic activity.

EXAMPLE

Beta - [1 - methyl - 4 - (4 - guanidinoacetamido - 1 - methyl 2 - pyrrolecarboxamido) - 2 - pyrrolecarbox-amido]propionamide Sodium methylate (140 parts) is dissolved in ethanol (1120 parts), the solution is cooled to 25° C., ethyl 4-nitro-2-pyrrolecarboxylate (402 parts) is added and then methyliodide (1070 parts) is added. Within a short time heat is evolved and it is necessary to periodically cool the solution in an ice bath to keep the temperature below 40° C. Crystalline solids begin to precipitate and the reaction mixture is allowed to sit overnight at room temperature. After chilling and filtering, the collected solids are washed thoroughly with water to remove much of the color. After drying to constant weight in the oven at 55° C., 384 parts (89%) of ethyl 1-methyl-4-nitro-2-pyrrolecarboxylate is obtained as light tan colored platelets, melting at 108°–112° C. Several recrystallizations from ethanol and treatment with activated charcoal give white platelets, melting at 113.2°–114.2° C. Additional crude material may be obtained by diluting the original mother liquor into water.

To a hot solution of sodium hydroxide (200 parts) in water (800 parts), a suspension of ethyl-1-methyl-4-nitro-2-pyrrolecarboxylate (365 parts) in hot ethanol (640 parts) is added. The yellow solid which forms is dissolved by heating the solvent to reflux and adding water (200 parts). Refluxing is continued for four and one-half hours. After then standing overnight at room temperature, coarse yellow crystals form. These are dissolved by the addition of hot water (2000 parts) and then this solution is acidified with excess 6N hydrochloric acid. The suspension is chilled and the crystalline solids are filtered. After drying in the oven at 55° C., to constant weight, 257 parts (82%) of 1-methyl-4-nitro-2-pyrrolecarboxylic acid, melting point 194°–197° C., are obtained. Several recrystallizations from ethanol and from mixtures of ethanol with water and one treatment with activated charcoal give white crystals, melting at 195°–197° C.

1-methyl-4-nitro-2-pyrrolecarboxylic acid is suspended in excess thionyl chloride (1 part per 4.89 parts) and the suspension is heated under reflux on the steam bath. Within 45 minutes all the acid is dissolved but refluxing is continued for another 15 minutes. Excess thionyl chloride is stripped at aspirator pressure leaving 1-methyl-4-nitro-2-pyrrolecarboxylic acid chloride as an oil which on cooling crystallizes to a dark gray benzene-soluble solid. The acid chloride may be used as such without any further purification.

A benzene (60 parts) solution of 1-methyl-4-nitro-2-pyrrolecarboxylic acid chloride, prepared from 15.3 parts of the corresponding acid, is added to a stirred solution of beta-alanine (13.5 parts) and sodium bicarbonate (20.7 parts) in water (75 parts). Carbon dioxide is evolved and the two phases are vigorously stirred overnight. The aqueous layer is separated, chilled in an ice bath and acidified to Congo Red with dilute sulfuric acid. The precipitated cream-colored crystalline solids are filtered, washed well with water and air dried to give 17.5 parts (78%) of N-(1-methyl-4-nitro-2-pyrrolyl-carbonyl)-beta-alanine, melting at 178°–182° C.

This crude dipeptide is purified by dissolving in 160 parts of hot ethanol, filtering, concentrating to about 70 parts by volume, chilling and filtering to give 11.4 parts of product melting at 180°–183° C. Repeated recrystallization from ethanol gives lustrous white clusters but does not raise the melting point.

A solution of N-(1-methyl-4-nitro-2-pyrrolylcarbonyl)-beta-alanine (10 parts) in 0.1 N aqueous sodium hydroxide solution (40 parts) is hydrogenated in a Parr low pressure apparatus with 10% palladium on carbon (4 parts) as catalyst. The hydrogen uptake is rapid and essentially quantitative. The catalyst is filtered to give an aqueous solution of the sodium salt of N-(4-amino-1-methyl-2-pyrrolylcarbonyl)-beta-alanine which may be used directly for the preparation of peptides. If desired, the salt may be isolated by evaporation of the solvent.

Sodium bicarbonate (6.9 parts) is added to the aqueous solution of the sodium salt of N-(4-amino-1-methyl-2-pyrrolyl)-beta-alanine, prepared above. The solution is stirred vigorously and a benzene (80 parts) solution of 1-methyl-4-nitro-2-pyrrolecarboxylic acid chloride, prepared from 6.8 parts of the acid, is added. Within a short time a yellow solid forms and stirring is continued at room temperature overnight. Water (250 parts) is added to dissolve the precipitated tripeptide sodium salt. The aqueous layer is separated and acidified to Congo Red test paper with dilute sulfuric acid to give a yellow crystalline solid. The crystals are filtered, washed with water and dried in air to give 15.0 parts of crude N-[1-methyl-4-(1-methyl-4-nitro-2-pyrrolylcarbonyl)amino-2-pyrrolylcarbonyl]-beta-alanine, melting at 237°–243° C. with decomposition.

Recrystallization from dimethylformamide-water mixture gives 8.5 parts (57%), melting at 249°–251° C. with decomposition. Several additional recrystallizations from dimethylformamide-water gives bright orange clusters, melting at 250°–251° C.

N-[1-methyl-4-(1-methyl-4-nitro-2-pyrrolylcarbonyl)-amino-2-pyrrolylcarbonyl]-beta-alanine (2 parts) is dissolved in dimethylformamide (12 parts) and tributylamine (1.01 parts), is added. The solution becomes cloudy but is cleared on addition of more dimethylformamide (3.2 parts). It is then chilled to −10° C. and ethyl chloroformate (0.73 parts) is added dropwise; the temperature rises to −5° C. and there is a small amount of gas evolution which soon ceases. The solution is maintained at between −10° and −5° C. for 10 minutes and then, while in the ice bath, dry ammonia gas is passed in. The temperature rises to about 20° C. and some solids (inorganic ammonium salts) form. The suspension is poured in water, filtered and the yellow crystals are suspended in 0.1 N aqueous sodium hydroxide solution. Very little, if any, of the material appears to dissolve. It is filtered and washed with water, acetone and ether and air dried to give 1.4 parts (70%) of beta-[1-methyl-4-(1-methyl-4-nitro-2-pyrrolecarboxamido)-2-pyrrolecarboxamido]propionamide, melting at 256°–258° C. with prior shrinking. Several recrystallizations from dimethylformamide-water give, after drying under reduced pressure over phosphorus pentoxide at 100° C. and at room temperature over concentrated sulfuric acid, material melting at 259°–260° C. with decomposition.

Beta-[1-methyl-4-(1-methyl-4-nitro-2-pyrrolecarboxamido)-2-pyrrolecarboxamido]propionamide (2.0 parts) dissolved in dimethylformamide (70 parts), is hydrogenated with 10% palladium on carbon (1 part) as catalyst in the Parr low pressure apparatus. The hydrogen uptake appears to be quantitative. The solution is filtered and the filtrate is stripped of solvent at aspirator pressure. The residual solids are washed with ether and dried in air to give 1.5 parts (82%) of beta-[1-methyl-4-(4-amino-1-methyl-2-pyrrolecarboxamido)-2-pyrrolecarboxamido]propionamide as a gray crystalline material melting at 241°–245° C. with decomposition.

The product is purified by recrystallization from dimethylformamide-water, followed by washing with hot ethanol and ether to give steel gray platelets melting at 243°–245° C. decomposition.

Tributylamine (4.2 parts) is added to a solution of guanidinoacetic acid hydrochloride (3.5 parts) in anhydrous dimethylformamide (100 parts). A gelatinous white solid forms immediately. The suspension is stirred and chilled to −10° C. and ethyl chloroformate (3.1 parts) is added. The temperature is maintained between −5° and −10° C. and the suspension is occasionally stirred as the white solids slowly dissolve to give, after about two hours, a clear colorless solution. Beta-[1-methyl-4-(4-amino-1-methyl-2-pyrrolecarboxamido)-2-pyrrolecarboxamido]propionamide (7.5 parts), is then added and the resulting suspension is occasionally stirred while the same temperature range as shown above is maintained. The amide slowly dissolves and a very mild evolution of gas is noted during the first hour. After two hours, the solution is allowed to warm to room temperature and after another hour, some unreacted amide (0.5 part) is filtered.

The filtrate is evaporated at water aspirator pressure leaving a dark red viscous oil which is dissolved in warm water (60 parts). The aqueous solution is then made alkaline with 1 N sodium hydroxide solution (47 parts). The oil which separates is taken up in ether and the aqueous phase is acidified with dilute aqueous sulfuric acid solution to a pH of 6.0. This solution is then chilled for several hours. Tan crystalline solids (2.3 parts) form. Two recrystallizations from water and one treatment with activated carbon give beta-[1-methyl-4-(4-guanidinoacetamido-1-methyl-2-pyrrolecarboxamido)-2-pyrrolecarboxamido]propionamide . 1/2H$_2$SO$_4$ as a white crystalline fiber-like product (melting point 186°–195° C. decomposition). The product is further purified by additional recrystallizations from water to give material melting with decomposition at 190°–194° C.

We claim:

1. Compounds of the group having the general formula:

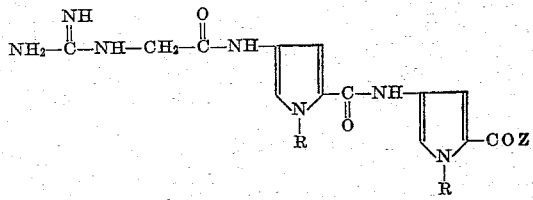

in which R is a lower alkyl radical, and Z is a member of the group consisting of lower alkanoic amino acids and amino lower alkanoic acid amides, the nitrogen atom of said amino acid forming an amide linkage with the carbonyl group of the pyrrole ring, alkali metal and acid addition salts.

2. Compounds in accordance with claim 1 in which Z is an amino lower alkanoic acid amide radical.

3. Beta-[1-methyl-4-(4-guanidinoacetamido-1-methylpyrrolecarboxamido)-2-pyrrolecarboxamido]-propionamide.

References Cited in the file of this patent

J. Am. Chem. Soc., vol. 37, pp. 2538–50 (1915).
J. Am. Chem. Soc., vol. 53, p. 188 (1931).
Ber. Deut. Chem. Ges., vol. 55, p. 1950 (1922).
C. A. 41, 1278 (1947) citing Am. Jr. Boton., vol. 33, pp. 638–47 (1946).